United States Patent
Bohlender et al.

(10) Patent No.: US 8,395,089 B2
(45) Date of Patent: *Mar. 12, 2013

(54) ELECTRICAL HEATING DEVICE

(75) Inventors: Franz Bohlender, Kandel (DE);
Michael Niederer, Kapellen-Drusweiler (DE); Holger Reiss, Rheinzabern (DE)

(73) Assignee: Eberspacher catem GmbH & Co. KG, Herxheim (DE)

( * ) Notice: Subject to any disclaimer, the term of this patent is extended or adjusted under 35 U.S.C. 154(b) by 200 days.

This patent is subject to a terminal disclaimer.

(21) Appl. No.: 12/886,814

(22) Filed: Sep. 21, 2010

(65) Prior Publication Data

US 2011/0068090 A1   Mar. 24, 2011

(30) Foreign Application Priority Data

Sep. 22, 2009   (EP) .................................... 09012038

(51) Int. Cl.
*B60L 1/02*   (2006.01)
*F24H 1/10*   (2006.01)

(52) U.S. Cl. ........ 219/202; 219/481; 219/548; 219/505; 219/504; 219/530; 219/532; 219/542; 219/538; 219/540; 392/485; 392/486; 392/491; 392/347

(58) Field of Classification Search .................. 219/202, 219/481, 548, 504, 542, 538, 505, 540; 392/491, 392/347

See application file for complete search history.

(56) References Cited

U.S. PATENT DOCUMENTS 6,055,360 A * 4/2000 Inoue et al. ................... 392/485
2003/0132222 A1* 7/2003 Bohlender .................... 219/504

FOREIGN PATENT DOCUMENTS

FR   2 793 546 A1   11/2000

OTHER PUBLICATIONS

European Search Report Dated Jan. 25, 2010 for European Patent Application No. EP 09 01 2038.
U.S. Appl. No. 12/886,829, filed Sep. 21, 2010, entitled Electrical Heating Device.

* cited by examiner

*Primary Examiner* — Shawntina Fuqua
(74) *Attorney, Agent, or Firm* — Boyle Fredrickson, S.C.

(57) ABSTRACT

An electrical heating device, which includes a housing, in which at least one heat generating element with at least one PTC element and electrical strip conductors abutting oppositely situated lateral faces of the PTC element and a plurality of heat dissipating elements arranged in parallel layers are accommodated, which are held abutted on oppositely situated sides of the heat generating element. An electrical heating device according to the invention and which fulfils the practical requirements, in particular with high voltage operation in an improved manner has at least one heat dissipating element which is situated, with the intermediate positioning of an electrically insulating layer, on the assigned heat generating element and can be electrically connected to a ground potential.

24 Claims, 6 Drawing Sheets

ELECTRICAL HEATING DEVICE

BACKGROUND OF THE INVENTION

1. Field of the Invention

This present invention relates to an electrical heating device, in particular for a motor vehicle, with a housing in which at least one heat generating element and a plurality of heat dissipating elements, which are configured in parallel layers, are arranged. In the housing a plurality of heat generating elements can be provided. Usually, for each heat generating element two heat dissipating elements are provided, which are mounted on oppositely situated sides of the heat generating element in order to discharge the heat produced by the heat generating element into the medium to be heated. Consequently, the heat dissipating elements are also designated as radiator elements, in particular when thermal dissipation into the air is desired.

The heat generating elements comprise at least one PTC element, on the opposite lateral faces of which electrical strip conductors are situated, through which the PTC element is supplied with current.

2. Description of the Related Art

Generic class-forming electrical heating devices are used in particular for heating air for the air conditioning of the vehicle passenger compartment and are being increasingly used to compensate the disadvantages associated with the reduced thermal dissipation of modern diesel engines, which include the fact that, particularly in the early operating phase of the engine, insufficient heat is available to heat the vehicle passenger compartment or to keep the windscreen free from condensation.

A generic electrical heating device is for example known from EP-A1-1 768 458. The electrical heating device described there has an increased electrical dielectric strength and is particularly suitable for high voltage operation. With this state of the art insulating layers are provided on the outer side of the strip conductors in each case so that the heat dissipating elements are situated, with the intermediate positioning of the insulating layer, on the associated heat generating element and are potential-free. An electrically conducting foreign body located on the electrical heating device and which, for example, touches the heat dissipating elements situated on opposite sides of the heat generating element, does not therefore lead to a short circuit.

As the electrical heating device for the purpose of this invention, apart from an air heater as given in EP-A1-1 768 458, a heater for a liquid medium can also be considered, as is known for example from EP-A1-1 872 986 which originates from the applicant. With this state of the art the heat generating elements are pushed into pockets closed on the underside and they contact these pockets on the inner sides. The pocket side walls, which in each case extend essentially parallel, should be considered as heat dissipating elements for the purpose of this invention. It is of no concern that the heat dissipating elements are each provided as separate components. Rather, the wording according to claim 1 is in each case based on that these are in each case provided on oppositely situated lateral faces of the heat generating element.

SUMMARY OF THE INVENTION

The object of the present invention is to provide an electrical heating device of the type mentioned in the introduction, which can fulfil the practical requirements, in particular in an improved manner with high voltage operation.

This object is solved according to the present invention by an electrical heating device having the features of Claim 1. This differs from the previously mentioned generic class-forming state of the art in that at least one heat dissipating element contacts the associated heat generating element, with the intermediate positioning of an electrically insulating layer, and can be electrically connected to the ground potential of the motor vehicle.

With the electrical heating device according to the invention a heat dissipating element, such as is already known from EP-A1-1 768 458 or EP-A1-1 872 986, contacts the heat generating element assigned to the heat dissipating element, with the intermediate positioning of an electrically insulating layer, in order to initially accommodate through thermal diffusion the heat generated by this heat generating element and to dissipate it to a medium streaming over the heat dissipating element. This heat dissipating element, which is provided potential-free with respect to the heat generating element due to the insulating layer, can moreover also be electrically connected to the ground potential of the motor vehicle. This connection normally occurs by the electrical contact of the corresponding heat dissipating element with an electrical conductor arrangement within the electrical heating device that can be connected to the motor vehicle ground via an electrical interface which is formed on the electrical heating device.

The electrical heating device according to the invention offers the possibility of screening due to the heat dissipating element which is connected to the ground potential. Thus, it is for example possible to arrange heat dissipating elements connected to the ground potential in each case on the outer side of a heating block in order to screen it on the outside. Normally, a layer structure of at least one heat generating element and the adjacent heat dissipating elements are taken to be a heating block. Depending on the heating power to be generated, a plurality of parallel layers of heat generating elements can form the heating block. To implement this invention the heating block is preferably held on the housing under the tension of a spring arranged in the housing. Normally, the housing is a housing which surrounds the heating block like a frame.

This invention further offers the advantage that the heat dissipating element, which is normally formed from meander-type, bent sheet metal band, can be extended beyond the heating block. Thus, it is conceivable that the sheet metal material of the heat dissipating element is extended straight and parallel beyond the layers of the layer structure in order to provide screening of the heating block through the heat dissipating element also in extension of the layers of the layer structure and at the side adjacent to the heating block. Here, control components of a control device arranged in the constructional unit with the electrical heating device can be provided, which can be included in the screen by this type of extension of the sheet metal material of the heat dissipating element.

The screen of the heating block or of the integrally provided control components is not insignificant with regard to EMC problems. With electrical heating devices of the generic type in a motor vehicle, normally high electrical powers are switched which can lead to electromagnetic interference within the motor vehicle. By connecting one, preferably a plurality, favourably all heat dissipating elements of the heating block to the ground potential of the motor vehicle these undesired effects can be reduced, or even eliminated.

According to a preferred further development of the present invention exposed electrical connecting elements for supplying current to the electrical strip conductors and at least one ground connection are provided on the housing. These connecting elements are preferably developed in the form of plug elements so that the electrical heating device can be electrically connected to the vehicle electrical system and the motor vehicle ground after simple assembly.

With regard to EMC problems previously mentioned above, it has proved to be of advantage if the ground connection is provided in an annular shape around at least one electrical connecting element and is connected to a screen of a connecting cable leading to the electrical connecting element. The said electrical connecting cable can be a power cable, i.e. for feeding the power for the operation of the electrical heating device. Normally, all electrical supply lines are provided in the connecting cable. The electrical connecting cable can however where applicable also be a signal cable for driving circuit elements of a control device provided as an integral part of the electrical heating device. Irrespective of the number of cable cores, this is normally provided with a screen connected to ground and which can be connected to the annular ground connection. Normally, the connection occurs via a plug connection.

With high voltage uses of the generic electrical heating device, i.e. with its operation with voltages of 220 volts and more, for reasons of safety an insulating layer is normally provided on the outer side of the electrical strip conductors to each heat generating element in order to keep all surfaces of the electrical heating device in the medium flow potential-free. However, since damage to the insulating layer over the service life of the electrical heating device cannot always be excluded, according to a further preferred embodiment of the present invention, a ground monitor is proposed which is assigned to the at least one heat dissipating element which can be connected to the ground potential. This ground monitor monitors the potential of the corresponding heat dissipating element and normally compares it to the ground potential of the motor vehicle. A faulty insulating layer directly results in a potential difference which the ground monitor detects and can be annunciated in the form of an indicating signal.

Due to the features proposed with the invention, the electrical heating device according to the invention is particularly suitable for operation in a high performance electric car. Here it is conceivable that the electrical heating device according to this invention is operated with operating voltages of up to 500 volts in an electric or hybrid car. The measures discussed individually in the present case, each of which provides safety for the electrical heating device and also in combination, facilitate operation of the electrical heating device according to the invention with appropriately high voltages. Thus, with this invention an electrical heating device can be provided, the thermal output of which far exceeds the currently usual range of approximately 2 kW. Electrical heating devices with a thermal output of between 3 and 10 kW are conceivable, in particular up to 6 kW. The screening of the heating block by the radiator layers connected to ground does not only result in an electrical auxiliary heater improved with regard to the EMC problem. Rather, all the heat dissipating elements, i.e. all the radiator elements, can be connected to the ground connection and monitored via the ground monitor.

Nowadays, it is assumed that with a high voltage operation of electrical heating devices insulating layers are provided between all the heat dissipating elements and the heat generating elements. These insulating layers can be formed from ceramics, plastic film or a combination of both materials. It is essential that the insulating layer exhibits a high electrical dielectric strength. Due to the good thermal conductivity, the use of ceramic layers for the electrical insulation between the heat generating element and the heat dissipating element abutting it is very probable. Ceramic material however exhibits the disadvantage that it is very brittle. Admittedly, these disadvantages can be countered through a sandwich construction of ceramic material and a less brittle material, for example a plastic film. Nevertheless, with a high voltage application the occurrence of a short circuit must be prevented. Here though, due to the ground monitor and with an error signal detected by the ground monitor, the power current can be switched off by a control device assigned to the ground monitor.

With this invention however further measures are also proposed of how the electrical safety can be improved, in particular during a high voltage operation.

The electrical safety and possible leakage currents, which also flow through or past an optionally provided electrical insulation and cannot be excluded, do not lead to serious problems if according to a preferred embodiment of the present invention all heat generating elements are installed in the housing in such a manner that the adjacent heat generating elements are in each case situated with their strip conductors of identical polarity opposite one another. Although the provided heat generating elements, which are located between oppositely situated heat dissipating elements and in the case of an insulating layer between the heat dissipating elements and the heat generating elements, are electrically insulated with respect to the heat dissipating elements, the heat dissipating element provided between adjacent heat generating elements is located, with an intermediate positioning of the insulating layer, against in each case strip conductors of identical polarity. Accordingly, an embodiment is produced in which a heat dissipating element between a first pair of heat generating elements is located electrically insulated by the insulating layer between two positive strip conductors, whereas the next heat dissipating element is provided, with the intermediate positioning of an insulating layer, between two negative poles. Instead of a single heat dissipating element, also a plurality, preferably identically formed heat dissipating elements, can be provided between two heat generating elements. In the case of defects in the insulating layer a short circuit between two heat generating elements is therefore not produced via the heat dissipating element.

The electrical safety of an embodiment of this nature can in this way be additionally improved in that a fault current measurement means is provided as part of the control device of the electrical heating device. This fault current measurement means can, for example, determine leakage or creep currents and find a fault in the required electrical insulation. A signal from the fault current measurement means which indicates a fault can lead to the complete electrical heating device switching off. The fault current measurement means can also be used before the electrical heating device is shipped in order to detect any possible assembly faults.

The aforementioned embodiment, in which the strip conductors of adjacent heat generating elements are in each case oppositely situated to one another with the same polarity, may be essential to the invention. For the realisation of this solution it is not necessary that the heat dissipating element is electrically connected to a ground potential. However, it is preferable to provide in each case an insulating layer between the heat dissipating element and the assigned heat generating element. The proposed solution is particularly significant if more than two heat generating elements are built into the housing.

With regard to a simple assembly the fault current measurement means and/or the ground monitor is preferably accommodated integrally in the housing and in fact as part of a control device arranged on the housing. With this embodiment the electrical heating device can be installed into the motor vehicle as a uniform component. Normally, the control device is installed into the data communication network of the vehicle via a bus system. This communication network can also process the fault signal from the ground monitor and annunciate it via a service connector or a display in the vehicle passenger compartment.

The Claims 7 to 9 provide further developments of the screen already presented. Thus, preferably the outer heat dissipating elements of the heating block are electrically connected together to form a screen surrounding the heating device. The connection of the outer heat dissipating elements can occur on one or both sides so that the heating block and an optional control device, integrally accommodated in the housing, are circumferentially surrounded by a screen. The screen normally circumferentially surrounds the heating block and the assigned control device and extends between the inlet opening for the medium to be heated and the discharge opening. The screen can however have wall sections, which extend parallel to the plane through which the medium passes at the inlet and/or discharge opening in the housing for the medium to be heated.

For the easy formation of part of the screen a screen panel is preferably used which extends laterally with respect to the layers of the heating block and electrically connects the outer heat dissipating elements together. In relation to the heating block the screen panel here is arranged such that it surrounds the at least one heat generating element on the outside. Preferably, the electrical connection between the outer heat dissipating elements and the screen panel occurs here using plug connections. The heat dissipating elements and the at least one screen panel are preferably formed by the stamping and/ or bending of sheet metal strips.

Further details of the present invention are given in the following description of an embodiment in conjunction with the drawing. The drawing shows the following:

DETAILED DESCRIPTION OF THE PREFERRED EMBODIMENTS

Figure 1:
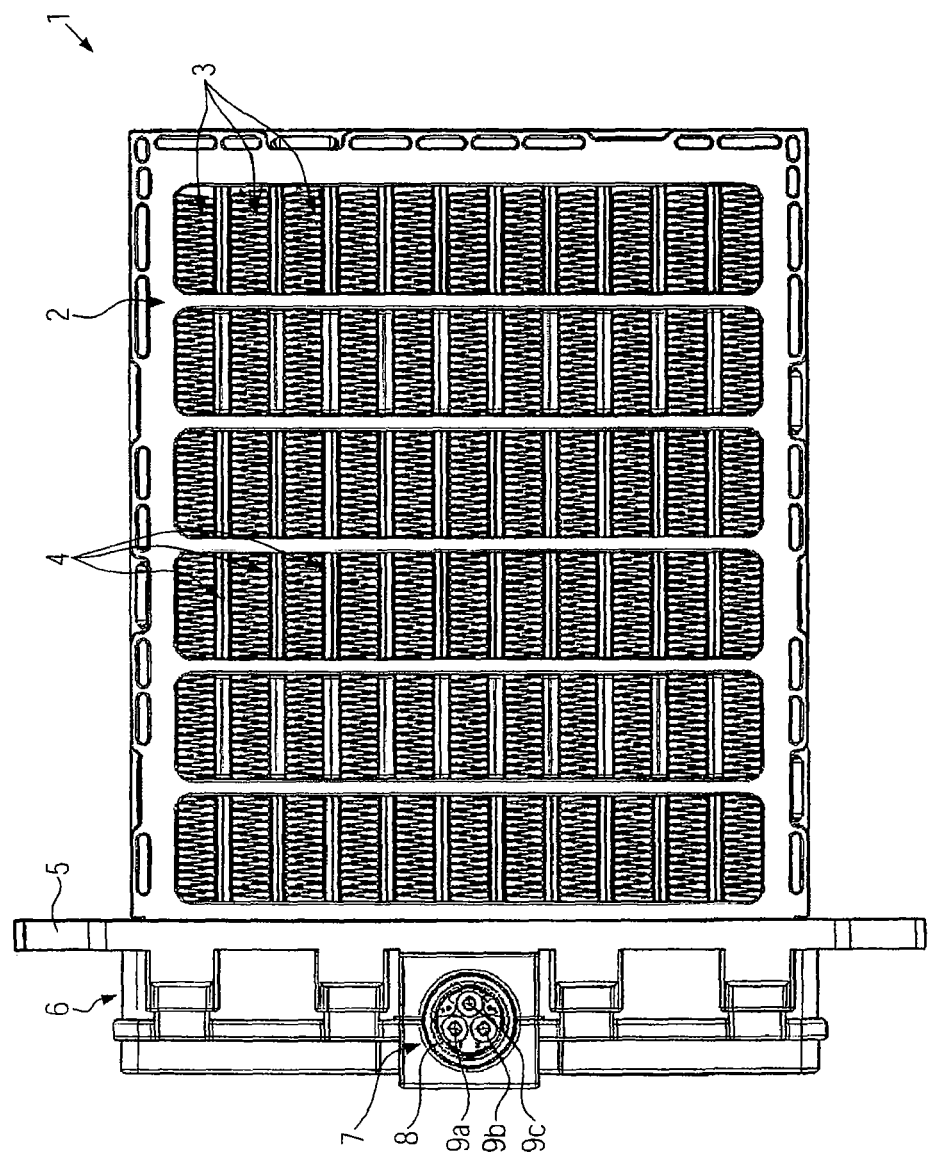
FIG. 1 a side view of an embodiment.

FIG. 1 illustrates a side view of an embodiment of an electrical heating device with a frame-shaped housing 1, which is formed from two plastic shells and accommodates a heating block 2. The heating block 2 comprises a plurality of heat dissipating elements 3 and a plurality of heat generating elements 4 which are provided in parallel layers. With the illustrated embodiment, at least on one longitudinal spar of the frame-shaped housing 1, a spring element (not illustrated) is provided, which holds the heating block 2 within the frame-shaped housing 1 under spring tension such that the layers of the layer structure are held pressed against one another. At the side of the heating block 2 the housing 1 has a mounting flange 5 as well as a control housing 6 protruding beyond the mounting flange 5. In this control housing 6 there is an electrical control device which is not further illustrated.

The embodiment illustrated in FIG. 1 can be electrically connected to the vehicle electrical system and the data network of the motor vehicle by control cables and power cables. In the illustrated embodiment a plug connection, identified with the reference numeral 7, is provided on the control housing 6 for the power cable and for the ground connection. The plug connection has attachment and guide surfaces in plastic, which are not shown in more detail, for a connecting mating connector on the end of a power cable. The power cable has a circumferentially formed screen, which is electrically connected to an annular ground connection 8 once the plug connection has been established. This annular ground connection 8 protrudes beyond the control housing 6 and surrounds the electrical connection elements 9a to 9c for the electrical connection of the power cables. The ground connection 8 is connected to the individual heat dissipating elements 3 using conductor tracks formed in the housing 1. The electrical connecting elements 9a to 9c are connected to individual or groups of heat generating elements 4 via power switches accommodated in the control housing 6 to supply them with current.

Figure 2:
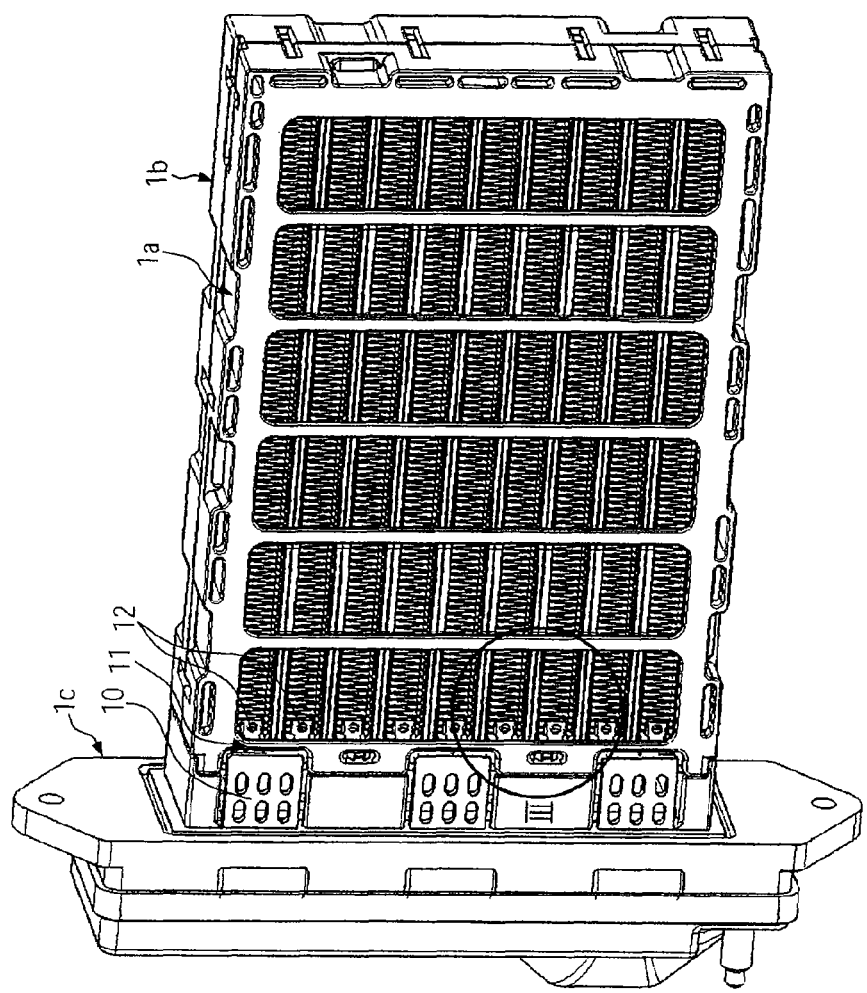
FIG. 2 a perspective side view of the opposite lateral face of the embodiment illustrated in FIG. 1.

The perspective side view according to FIG. 2 more clearly shows the structure of the housing 1. The housing 1 consists of two housing parts 1a, 1b, each of which is identically formed and protruded at the end by the control housing 6. In the control housing 6 a control device for the electrical heating device is provided, which comprises, among others, electronic control components for the control of the heating block 2. The heat dissipated by the control components is led away via the cooling elements identified with reference numeral 30 to the air flowing to the heating block 2. In this respect, at the side adjacent to the openings to the heating block, the housing 1 forms in each case three flow channels leading to the cooling elements 30. A transverse spar 11 of the housing provided adjacent to the cooling elements 30 is surmounted on the inside by a conducting element 10 with metal claws 12, which are located at about the height of the internal surface of the housing part 1a and interact with the heat dissipating elements 3 such that the claws 12 are in electrical contact with the meandering, bent sheet metal strips of the heat dissipating element 3. All the heat dissipating elements 3 interact with a corresponding claw 12, i.e. they are connected together electrically through the conducting element 10.

Figure 3:
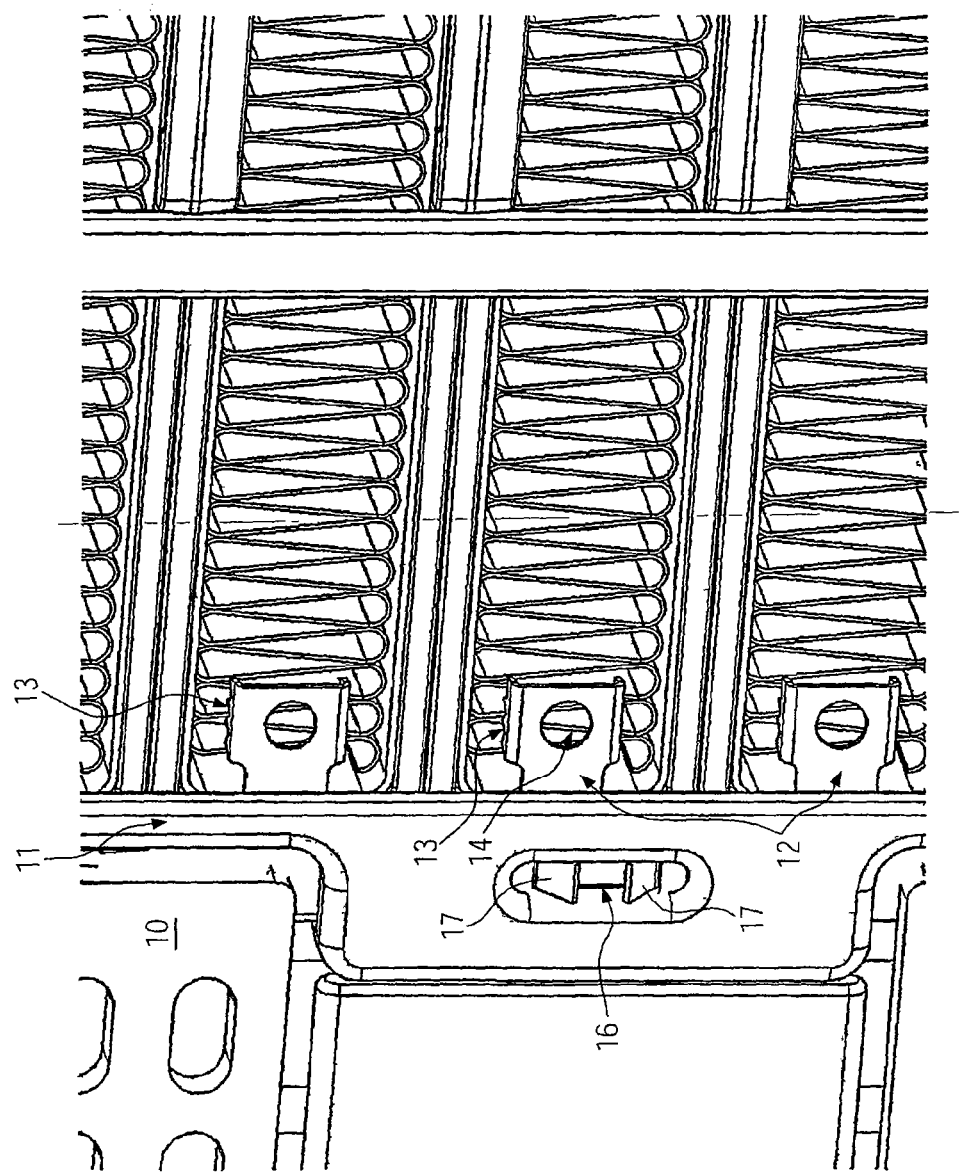
FIG. 3 the detail III drawn in FIG. 2 in an enlarged illustration.
Figure 4:
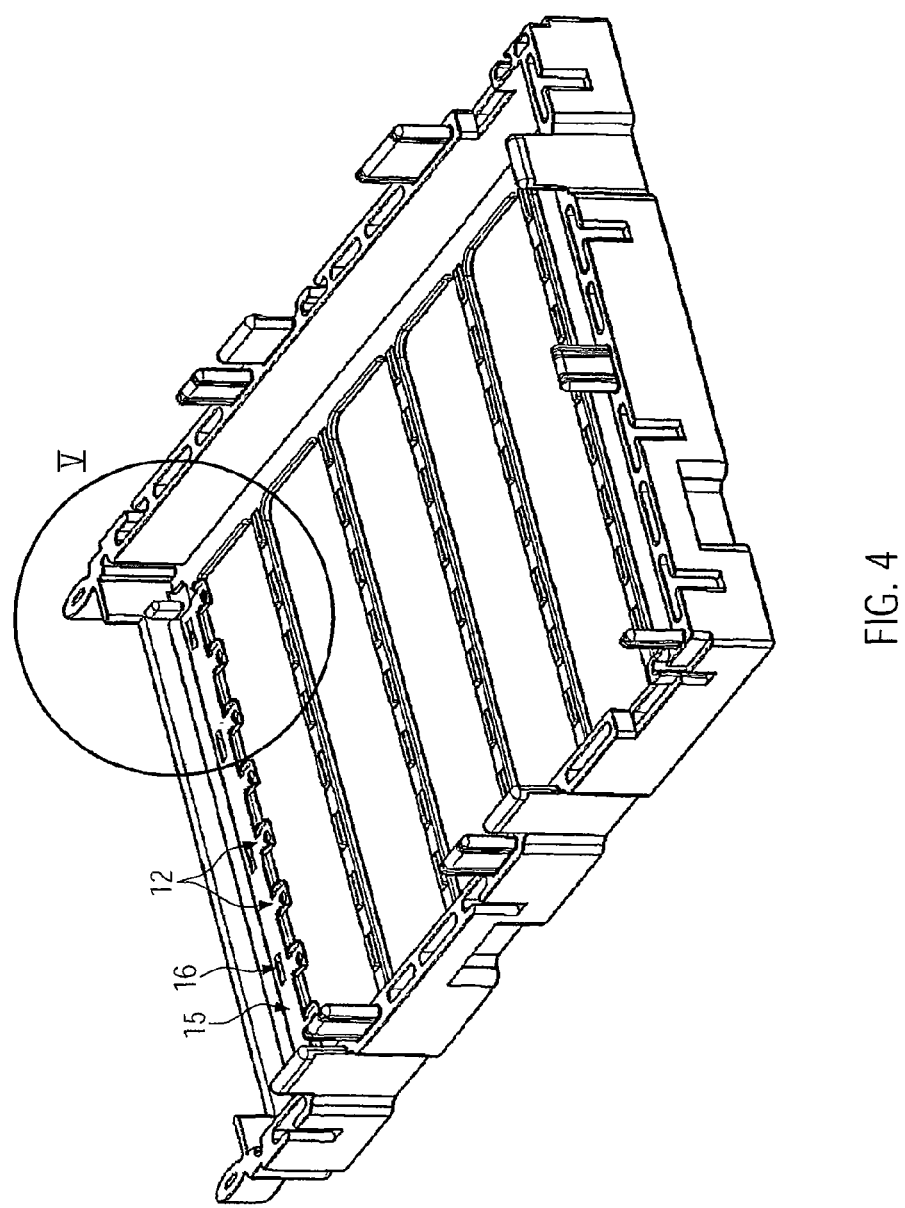
FIG. 4 the housing part illustrated in FIG. 2 before installation of the heating block.
Figure 5:
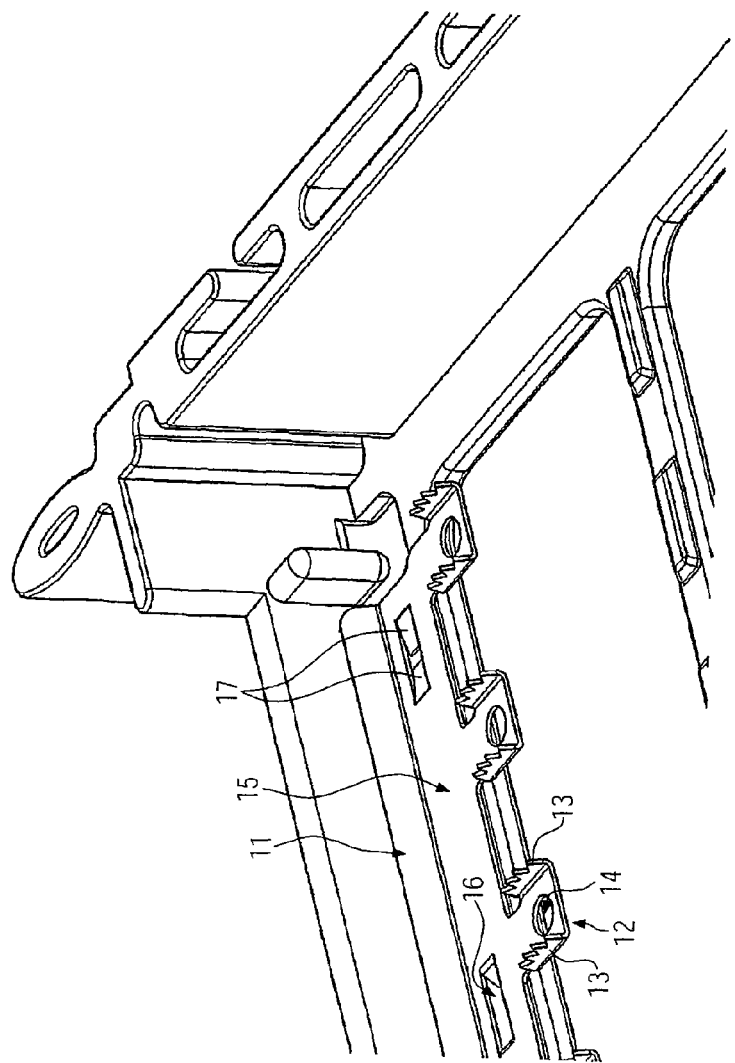
FIG. 5 the detail V illustrated in FIG. 4 in an enlarged illustration.

As can be seen in particular from FIG. 4, the claws 12 are formed by stamping from a sheet metal band. The claws 12 are cut free on the heating-block side of the longitudinal side of the sheet metal band by stamping and formed with rows of teeth 13 at the side by stamping and bending, as can be surmised in FIG. 3 and seen in FIG. 5. These rows of teeth 13 have a ridge, extending in the flow direction, i.e. at right angles to the layers of the heating block 2, from which a tooth profile protrudes, which interacts with the corrugated ribs of the heat dissipating element 3. To minimise the flow resistance by the claws 12 a recess 14 is provided centrally in the claws 12.

The claws 12 protrude from a longitudinal conducting element base 15, which extends parallel to the transverse spar 11 and abuts on its inner side. For mounting, latching receptacles 16 are cut out on the transverse spar 11. These latching receptacles 16 are located in each case between the cooling elements 30 (cf. FIG. 2). Spring-loaded latching lugs 17 are formed on the conducting element base 15 by stamping and bending. The conducting element base 15 can be mounted accordingly by clipping and interaction of the latching receptacles 16 with the latching lugs 17 on the housing part 1. The conducting element base 15 is normally electrically connected to parts of the control housing via a contact ridge, which for example can be formed by stamping and/or bending. Here, a ground monitor and/or a fault current measurement means is normally located, which is normally electrically connected to the conducting element base 15.

The heating block 2 is inserted into the unit, which can be seen in FIG. 4 and which is formed from an injection moulded plastic part 1a and the conducting element 10 formed from metal sheet, consisting of the conducting element base 15 and the claws 12. Here, in each case a heat dissipating element 3 is in each case attached to a claw 12. Furthermore, in the housing part 1a at least one spring is inserted, which subjects the heating block, respectively the layers forming the heating block 2 under tension, after final assembly of the electrical heating device, and in fact with a spring force, which is exerted transversely to the layers of the heating block 2 and within the plane of the heating block 2.

Once the elements of the heating block 2 and the at least one spring element have been installed in the housing part 1a, the housing 1 is closed. With this closure of the housing the latching tongues identified with reference numeral 18 and provided on the housing parts 1a, 1b spring into place so that both housing parts 1a, 1b are joined together. At the end of the joining movement in the direction of the air flow through the heating block 2, the claws 12 with their rows of teeth 13 are forced against the heat dissipating elements, which subsequently also partially deform plastically. At the end of the joining movement the claws 12 are reliably electrically connected to the heat dissipating elements 3.

Figure 6:
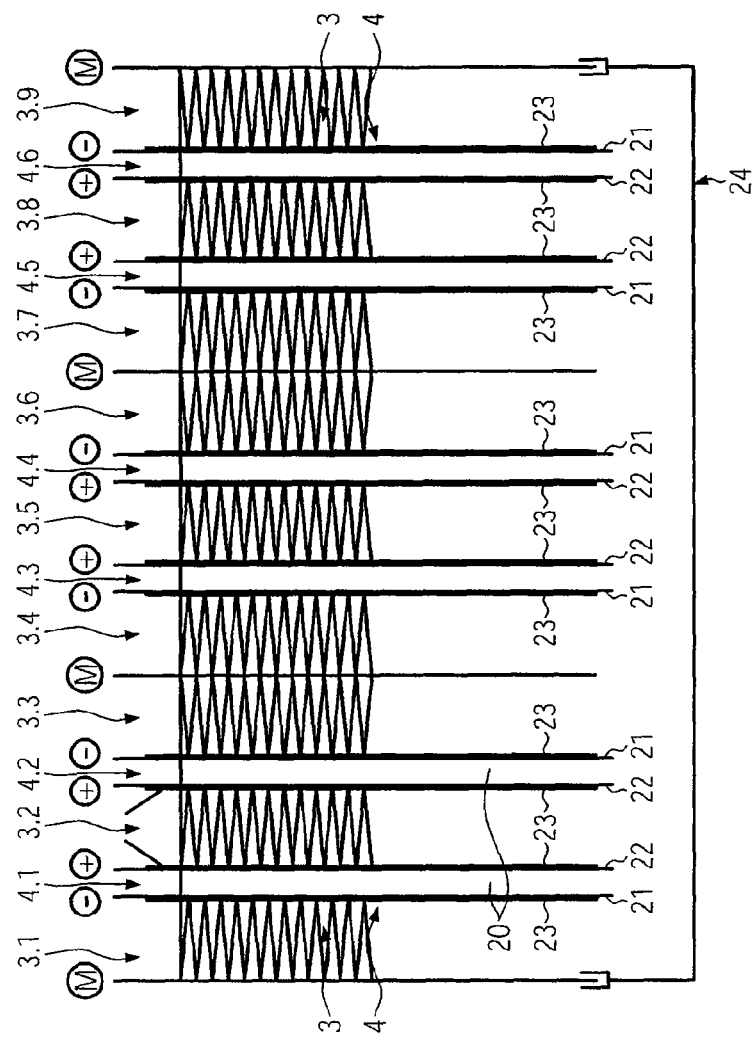
FIG. 6 a side view of a heating block of an embodiment for elucidating the electrical connection of the individual elements of the heating block for the purpose of this invention.

The electrical assignment of the individual elements of the heating block 2 to the connecting elements 8, 9 can be taken from the illustration in FIG. 6. It shows schematically a heating block with a plurality of heat generating elements 4, which are each provided with parallel alignment relative to one another and each at least comprising a PTC element 20 which is arranged between the strip conductors 21, 22 and is supplied with current via these strip conductors 21, 22. On the outer side of the strip conductors 21, 22 there are in each case electrically insulating layers 23.

The heat dissipating elements 3, formed as corrugated ribs, abut in each case on both sides of the heat generating elements 4. As can be see from FIG. 6, two heat generating elements 4.1, 4.2; 4.5, 4.6 each share a heat dissipating element 3.2, respectively 3.8. Just as easily, two identical heat dissipating elements 3.3, 3.4 are provided between two adjacent heat generating elements 4.2, 4.3.

In the embodiment elucidated in FIG. 6 all the heat generating elements 4 have in each case the insulating layer 23 on the outer side so that all heat dissipating elements 3 are provided potential free. The heat dissipating elements 3 are each electrically connected to the ground connection 8 via ground connections, which are formed with the claws 12 and identified with the reference numeral M in the electrical connection diagram according to FIG. 6. The corresponding situation applies to the strip conductors 21, 22 formed as sheet metal bands with reference to the electrical connecting elements 9a to 9c for the power current. The strip conductors 21 are each connected to the negative or ground pole and the strip conductors 22 are each connected to the positive pole of a power source. This connection often occurs however via intermediate switching of power switches, which are accommodated in the control housing 6 and can be switched via a logic circuit in the control housing. Furthermore, in the housing a ground monitor is provided which is not illustrated and which is electrically connected to all the ground connections M and preferably realises a potential balance between them and the ground connection 8 to determine any possible faults in an insulating layer 23, which would lead to a potential difference. However, the arrangement is selected according to FIG. 2 so that even with a fault in the insulating layer a short circuit still does not occur. Thus, the identical polarities of different and adjacent heat generating elements 4 are in each case situated opposite one another. Accordingly sheet metal bands of identical polarity are located on both sides of the heat dissipating elements 3.2, 3.3, 3.4, 3.5, 3.6, 3.7 or 3.8 arranged between two heat generating elements 4 and separate from the insulating layers 23.

In FIG. 6 a definitive embodiment of a screen of the heating block 2 is schematically illustrated, which is formed by a screen panel 24, which extends essentially at right angles to the layers of the heating block 2 and is connected to the free ends of the outer heat dissipating elements 3.1 or 3.9. An appropriate screen panel 14 can be provided such that the control elements of a control device are located within the screen. The screen can for example also be formed as part of a housing cover for the control housing 6 and only electrically connected to the outer heat dissipating elements 3.1 or 3.9 after closure of the control housing 6 by the housing cover.

LIST OF REFERENCE NUMERALS

1 Housing
1a Housing part
1b Housing part
2 Heating block
3 Heat dissipating element
4 Heat generating element
5 Mounting flange
6 Control housing
7 Plug connection
8 Ground connection
9a to 9c Connecting element
10 Conducting element
11 Transverse spar
12 Claw
13 Row of teeth
14 Recess
15 Conducting element base
16 Latching receptacles
17 Latching lug
18 Latching tongue
20 PTC element
21 Strip conductor
22 Strip conductor
23 Insulating layer
24 Screen panel
25 Cooling element
M Ground connection
− Negative pole of power current
+ Positive pole of power current

The invention claimed is:
1. An electrical heating device, comprising:
a housing in which are accommodated 1) at least one heat generating element with at least one PTC element and electrical strip conductors abutting oppositely situated lateral faces of the at least one PTC element and 2) a plurality of heat dissipating elements which are arranged in parallel layers and which are held abutted on oppositely situated sides of the at least one heat generating element, an electrically insulating layer situated between the at least one heat generating element and at least one of the heat dissipating elements, exposed electrical connecting elements for supplying current to the electrical strip conductors, and a ground connection via which the at least one heat dissipating element can be electrically connected to a ground potential.

2. An electrical heating device according to claim 1, further comprising at least one ground monitor assigned to at least one of the heat dissipating elements.

3. An electrical heating device according to claim 2, further comprising a control device arranged on the housing and including the ground monitor.

4. An electrical heating device according to claim 1, wherein all of the heat generating elements are built into the housing such that the mutually adjacent heat generating elements are each situated with their strip conductors of identical polarity opposite one another.

5. An electrical heating device according to claim 4, wherein outer ones of the heat dissipating elements are connected together electrically by a screen panel which extends transversely to the layers and which surrounds the at least one heat generating element on an outer side thereof.

6. An electrical heating device according to claim 5, further comprising an electrically conducting screen which is connected to a screen panel and which screens a controller of the electrical heating device.

7. An electrical heating device, comprising:
a housing in which are accommodated 1) at least one heat generating element with at least one PTC element and electrical strip conductors abutting oppositely situated lateral faces of the at least one PTC element and 2) a plurality of heat dissipating elements which are arranged in parallel layers and which are held abutted on oppositely situated sides of the at least one heat generating element, an electrically insulating layer situated between the at least one heat generating element and at least one of the heat dissipating elements, exposed electrical connecting elements for supplying current to the electrical strip conductors, and a ground connection via which the at least one heat dissipating element can be electrically connected to a ground potential, wherein the ground connection is provided in an annular shape around at least one of the electrical connecting elements and can be connected to a screen of a connecting cable leading to the electrical connecting element.

8. An electrical heating device according to claim 7, wherein all of the heat dissipating elements are located on the assigned heat generating element with the intermediate positioning of an electrical insulating layer and can be connected to the ground potential, in particular of the vehicle.

9. An electrical heating device according to claim 7, further comprising a control device arranged on the housing and including a ground monitor assigned to at least one of the heat dissipating elements.

10. An electrical heating device according to claim 7, wherein outer ones of the heat dissipating elements are electrically connected together for forming a screen surrounding the heating device.

11. An electrical heating device according to claim 7, wherein all of the heat generating elements are built into the housing such that the mutually adjacent heat generating elements are each situated with their strip conductors of identical polarity opposite one another.

12. An electrical heating device according to claim 11, wherein outer ones of the heat dissipating elements are connected together electrically by a screen panel which extends transversely to the layers and which surrounds the at least one heat generating element on an outer side thereof.

13. An electrical heating device, comprising:
a housing in which are accommodated 1) at least one heat generating element with at least one PTC element and electrical strip conductors abutting oppositely situated lateral faces of the at least one PTC element and 2) a plurality of heat dissipating elements which are arranged in parallel layers and which are held abutted on oppositely situated sides of the at least one heat generating element, an electrically insulating layer situated between the at least one heat generating element and at least one of the heat dissipating elements, exposed electrical connecting elements for supplying current to the electrical strip conductors, and a ground connection via which the at least one heat dissipating element can be electrically connected to a ground potential, wherein all of the heat dissipating elements are located on the assigned heat generating element with the intermediate positioning of an electrical insulating layer and can be connected to the ground potential, in particular of a vehicle.

14. An electrical heating device according to claim 13, wherein the ground connection is provided in an annular shape around at least one of the electrical connecting elements and can be connected to a screen of a connecting cable leading to the electrical connecting element.

15. An electrical heating device according to claim 2, further comprising a control device arranged on the housing and including the ground monitor assigned to at least one of the heat dissipating elements.

16. An electrical heating device according to claim 4, wherein outer ones of the heat dissipating elements are electrically connected together for forming a screen surrounding the heating device.

17. An electrical heating device according to claim 4, wherein outer ones of the heat dissipating elements are connected together electrically by a screen panel which extends transversely to the layers and which surrounds the at least one heat generating element on an outer side thereof.

18. An electrical heating device, comprising:
a housing in which are accommodated 1) at least one heat generating element with at least one PTC element and electrical strip conductors abutting oppositely situated lateral faces of the at least one PTC element and 2) a plurality of heat dissipating elements which are arranged in parallel layers and which are held abutted on oppositely situated sides of the at least one heat generating element, an electrically insulating layer situated between the at least one heat generating element and at least one of the heat dissipating elements, exposed electrical connecting elements for supplying current to the electrical strip conductors, and a ground connection via which the at least one heat dissipating element can be electrically connected to a ground potential, wherein outer ones of the heat dissipating elements are electrically connected together for forming a screen surrounding the heating device.

19. An electrical heating device according to claim 18, wherein the ground connection is provided in an annular shape around at least one of the electrical connecting elements and can be connected to a screen of a connecting cable leading to the electrical connecting element.

20. An electrical heating device according to claim 19, wherein all of the heat dissipating elements are located on the assigned heat generating element with the intermediate positioning of an electrical insulating layer and can be connected to the ground potential, in particular of the vehicle.

21. An electrical heating device according to claim 2, further comprising a control device arranged on the housing and including the ground monitor assigned to at least one of the heat dissipating elements.

22. An electrical heating device according to claim 19, wherein all of the heat generating elements are built into the housing such that the mutually adjacent heat generating elements are each situated with their strip conductors of identical polarity opposite one another.

23. An electrical heating device according to claim 18, wherein outer ones of the heat dissipating elements are connected together electrically by a screen panel which extends transversely to the layers and which surrounds the at least one heat generating element on an outer side thereof.

24. An electrical heating device according to claim 18, further comprising an electrically conducting screen which is connected to a screen panel and which screens a controller of the electrical heating device.

* * * * *